(No Model.)

G. W. LORD.
CANT HOOK.

No. 303,870. Patented Aug. 19, 1884.

WITNESSES:
Theo. G. Hoster
C. Sedgwick

INVENTOR:
G. W. Lord
BY Munn & Co
ATTORNEYS.

UNITED STATES PATENT OFFICE.

GEORGE W. LORD, OF BLOOMINGTON, PENNSYLVANIA.

CANT-HOOK.

SPECIFICATION forming part of Letters Patent No. 303,870, dated August 19, 1884.

Application filed January 14, 1884. (No model.)

*To all whom it may concern:*

Be it known that I, GEORGE W. LORD, of Bloomington, in the county of Clearfield and State of Pennsylvania, have invented a new and useful Improvement in Cant-Hooks, of which the following is a full, clear, and exact description.

This invention consists in certain novel constructions of the hook proper and joint portion of the clip to which it is pivoted, whereby said hook is prevented both from falling unduly forward and from moving unduly back, and thus is always kept within a convenient range of motion for its work. The invention also embraces an improved construction of the outer or end ferrule and shank of the pick, whereby the pick and ferrule are more securely held in position and the stock is strengthened, substantially as hereinafter described.

Reference is to be had to the accompanying drawings, forming a part of this specification, in which similar letters of reference indicate corresponding parts in all the figures.

Figure 1:
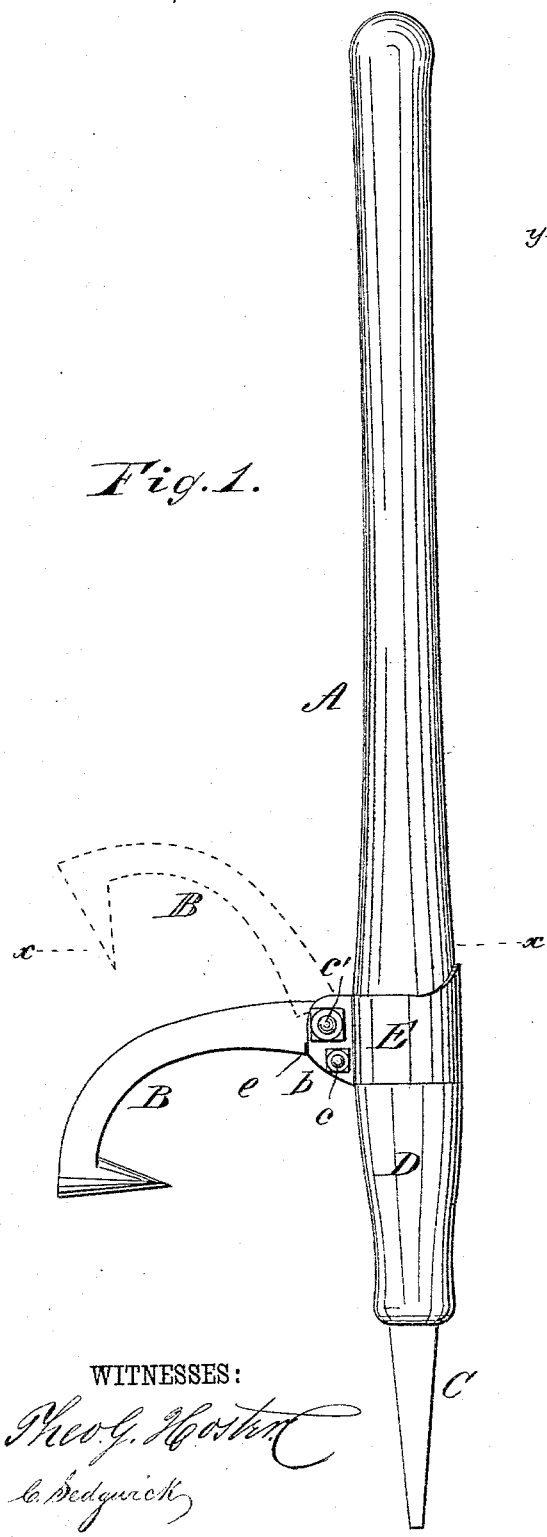
Figure 2:
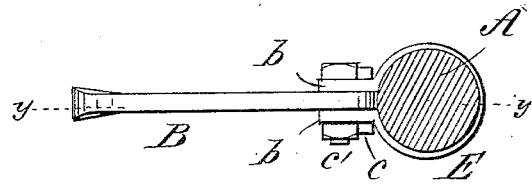
Figure 3:
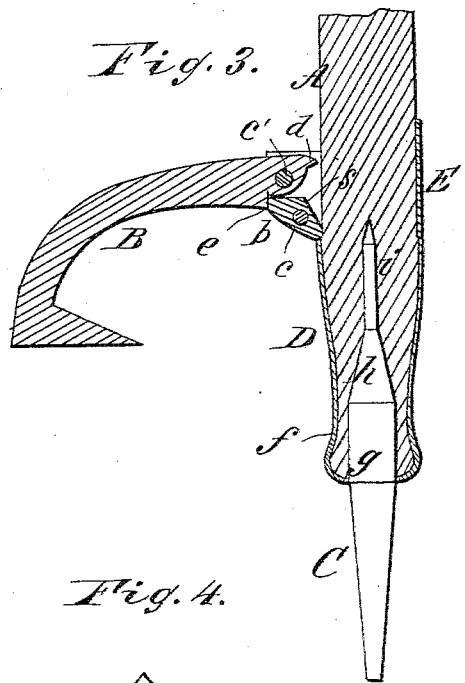
Figure 4:
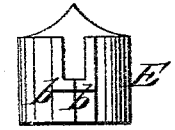

Figure 1 represents a side view of a cant-hook embodying my invention, the same showing the hook proper in its forward position in full lines, and as thrown back in dotted lines. Fig. 2 is a transverse section of the same on the line $x x$ in Fig. 1. Fig. 3 is a section on the line $y y$ in Fig. 2, and Fig. 4 a longitudinal view of the inner ferrule or clip detached.

A is the wooden lever of the cant-hook, and B the hook at or near its end for canting and turning over heavy logs. C is the pick of the cant-hook, D its outer or end ferrule, and E an inner ferrule or clip. This inner ferrule or clip has its divided jaw portion $b$ held together and tightened by two cross-bolts, $c\ c'$, the one $c'$ of which forms the pivot for the hook B to swing upon. The other bolt, $c$, passes through two solid or meeting portions of said jaw portion, which are cut away on their inner side, or constructed, as at $s$, to form a stop or rest for a lip or projection, $d$, on the rear or inner end of the hook to strike and bear against when the hook is thrown back, as shown by dotted lines in Fig. 1; and said hook B is further constructed in proximity to its pivot with a front jog or shoulder, $e$, which, when the hook is in its forward position, shuts down on the solid part of the jaw portion of the clip, and so forms a stop to arrest the hook from any further forward movement. Thus the hook B is prevented both from falling unduly forward and from being thrown unduly back, whereby it is kept within a convenient range of motion, which will greatly facilitate the use of the cant-hook. The end ferrule, D, is of flaring construction on its inside at or near its outer end, as shown at $f$, where the shank $g$ of the pick C enters the wooden lever A. This construction serves to assist in holding said pick and ferrule from getting loose. The shank of the pick, too, is made first straight for a portion of its length, starting from the root, as shown at $g$, then tapering for a distance, as shown at $h$, and finally straight, but of reduced dimensions for the remainder of its length, to or near its point, as shown at $i$. This gives increased strength to the stock, where it usually is weak, and further assists in preventing the pick from getting loose, as all picks having continuously-tapering or wedge-shaped shanks are liable to do.

Having thus described my invention, I claim as new and desire to secure by Letters Patent—

1. The combination, with the lever A, having the clip E, provided with a jaw, $b$, and a beveled stop or rest, of the swinging hook B, provided with an outer front jog or shoulder, $e$, facing inward and formed by stepping the inner end of said hook, and with beveled inner lip or projection, $d$, the ferrule D, flared downward, and the pick C, with its shank formed with an enlarged outer straight portion, an intermediate continuous tapering portion, and an inner reduced straight portion, substantially as and for the purpose set forth.

2. In a cant-hook, the swinging hook B, constructed with a front jog or shoulder, $e$, facing inward and formed by stepping the inner end of said hook, and with beveled inner lip or projection, $d$, in combination with the clip E, having a jaw, $b$, and constructed to form a beveled stop or rest for said shoulder and lip to bear against, to limit the swinging motion of the hook, substantially as specified.

GEORGE W. LORD.

Witnesses:
JOSEPH POWERS,
C. C. McDONALD.